(No Model.)
V. E. KEEGAN.
ELECTRO MAGNETIC MOTOR.
No. 338,976. Patented Mar. 30, 1886.
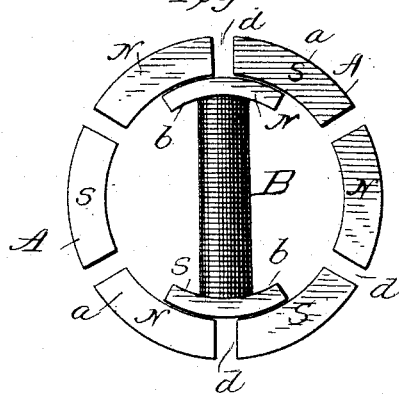
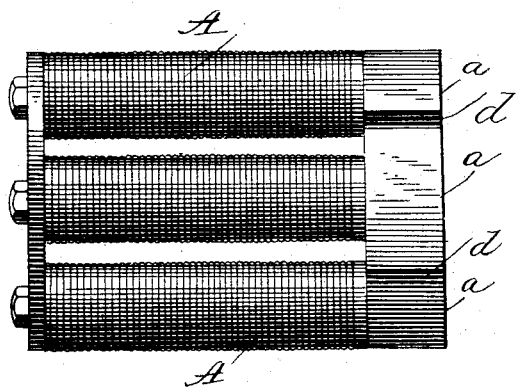
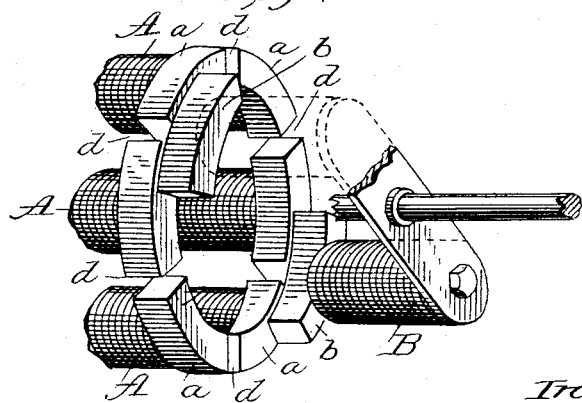
Attest
Walter Donald
F. L. Middleton
Inventor
Vincent E. Keegan
by Joyce & Spear
Attys.

UNITED STATES PATENT OFFICE.

VINCENT E. KEEGAN, OF BOSTON, MASSACHUSETTS.

ELECTRO-MAGNETIC MOTOR.

SPECIFICATION forming part of Letters Patent No. 338,976, dated March 30, 1886.

Application filed October 31, 1885. Serial No. 181,515. (No model.)

*To all whom it may concern:*

Be it known that I, VINCENT ELIJA KEEGAN, of Boston, in the county of Suffolk and State of Massachusetts, have invented a new and useful Improvement in Electro-Magnetic Motors; and I do hereby declare that the following is a full, clear, and exact description of the same.

My invention relates to electro-magnetic motors, and is an improvement upon the machine shown in Letters Patent of the United States granted to me on the 10th day of April, 1883, and numbered 275,392. In that patent the poles of a single moving magnet were arranged in such relation to each other and to corresponding poles of a fixed magnet that as the one moved before the other gradual changes of polarity were produced without disruptive discharge, and simultaneous changes of polarity would occur when the machine was used as a dynamo, and a reverse action when such construction was used as a motor.

The object of my present invention is to increase the efficiency of the machine by an increase in the number of field-magnets, and by giving the moving magnet or armature the same relation to the whole field of force, whereby the armature is simultaneously acted on by four field-poles.

Heretofore in electric motors when the armature was caused to move in front of the circularly-arranged face of the stationary magnets simultaneous attractions and repulsions have existed in the poles of two separate independent armatures, and successive or alternate attractions and repulsions existed in the poles of each armature separately. In result my invention differs from these in this, that the attractions and repulsions in my machine act simultaneously in the poles of one and the same armature before the four poles of two field-magnets.

My invention is shown in the accompanying drawings, in which Figure 1 represents a face view of the series of stationary magnets with the moving magnet. Fig. 2 is a side elevation of the magnets, showing the poles. Fig. 3 is a perspective view of a modified form of the machine.

In these drawings, the magnets of the stationary series are marked A, the polar extensions being indicated at *a*. They are arranged in cylindrical form with narrow spaces *d*, from one-half to three-sixteenths of an inch, according to the size of the machine between the poles. In the tubular space within the circularly-arranged poles *a* is mounted the moving magnet or armature B, having its axis in radial line to the cylindrical series of stationary magnets. The poles *b* of the moving magnet are plain curved pieces, and are in length greater than the width of the spaces *d* between the poles *a*, so that each begins to pass in front of any given pole *a* before leaving the pole next preceding.

In the position shown in Fig. 1 the north pole of the armature is attracted by the south pole of the magnet to which it is approaching, and is repelled by the north pole of the magnet from which it is receding; and in like manner the south pole of the armature is attracted by the north pole ahead of it and repelled by the south pole from which it is receding.

When the poles of the armature are parallel with those of the field-magnet or in full circuit, the polarity of the armature is changed by the commutator, and the armature-pole is attracted by the next succeeding pole of the field-magnet. The armature is thus continually in its whole circuit impelled both by the attraction and repulsion in each pole of the armature at each passage over the poles of the series of field-magnets. It will be apparent that while these results are secured as well in this as in the machine shown in my said patent, a greater amount of leverage is obtained by this machine.

In Fig. 3 I have shown a modified form of the machine. The field-magnet and poles are the same as in Fig. 1, the poles being sections of a hollow cylinder; but the armature is outside of the series of field-magnet poles and in line therewith, and the poles of the armature are in shape similar to those of the field-magnets and move in front of the cylindrically-arranged series, instead of within them. This form is constructed in all other respects like that of Fig. 1. It has some advantages over the form shown in Fig. 1 for large motors, as thereby the number of poles of the armature may be increased and a greater amount of simultaneous attraction and repulsion is produced by reason of a number of armatures all acting together as one, thereby giving an increased power over what would be obtained by one armature and one field-magnet, as described in my aforesaid patent.

I am aware of the constructions shown in the United States Patents Nos. 153,456, 211,404, and 241,054, and have limited my claims to the special arrangement shown by me.

I claim as my invention—

A series of field-magnets arranged in a circle, in combination with a revolving armature outside of the field-magnets, and having its poles parallel therewith, the poles of said armature being in the direction of their movement of greater extent than the spaces between the poles of the field-magnets, each pole and the armature being arranged to be acted upon simultaneously by attraction and repulsion of the four poles of two field-magnets, substantially as described.

In testimony whereof I have signed my name to this specification in the presence of two subscribing witnesses.

VINCENT E. KEEGAN.

Witnesses:
J. B. THOMPSON,
F. L. MIDDLETON.